March 29, 1955    M. B. LAYNE ET AL    2,705,167
WELL FISHING AND HANDLING TOOL
Filed July 12, 1950    8 Sheets-Sheet 1

INVENTORS,
Mark B. Layne,
Lawrence L. Heid.
BY Hamilton & Hamilton,
Attorneys.

March 29, 1955 M. B. LAYNE ET AL 2,705,167

WELL FISHING AND HANDLING TOOL

Filed July 12, 1950 8 Sheets-Sheet 3

INVENTORS.
Mark B. Layne,
Lawrence L. Held.
BY
Hamilton & Hamilton,
Attorneys.

March 29, 1955

M. B. LAYNE ET AL 2,705,167

WELL FISHING AND HANDLING TOOL

Filed July 12, 1950

INVENTORS,
Mark B. Layne,
BY Lawrence L. Heid.
Hamilton & Hamilton,
Attorneys.

Fig. 16

United States Patent Office 2,705,167
Patented Mar. 29, 1955

2,705,167

WELL FISHING AND HANDLING TOOL

Mark B. Layne and Lawrence L. Held, Higginsville, Mo.

Application July 12, 1950, Serial No. 173,394

4 Claims. (Cl. 294—99)

This invention relates to improvements in a well fishing and handling tool, suitable especially for deep well work where the power to operate the tool is located adjacent the tool and is controlled manually from the ground surface.

The principal object of the present invention is the provision of well fishing and handling tool having suitable stored energy carried by said tool and manually operable control means at the ground surface to properly apply the energy to operate the tool parts wherever positioned in the well.

Another object of the invention is the provision of a well fishing and handling tool having work engaging wedges provided with sufficient pressure, whereby they are imbedded in the work sufficiently to carry the required load or to provide sufficient torque to hold the pipe section to unscrew sections of the pipe for their removal from the well.

A further object of this invention is the provision of a well fishing and handling tool having work engaging wedges operable to engage the outside of well equipment for positioning in and removal from the well.

Another object of the present invention is the provision of a well fishing and handling tool adapted to be operated at great depths from the earth surface by means of electric, hydraulic or fluid power.

A still further object of this invention of well fishing and handling tool having tapered work engaging wedges operable by rotary means.

Another object is the provision of a well fishing and handling tool having work engaging wedges so positioned and operated that the greater the load the greater the gripping pressure of the wedges against the work.

Other objects are simplicity and economy of construction, ease and efficiency of operation and adaptability for engaging substantially any type of equipment that might be positioned in or removed from a well.

Throughout the several views like numerals refer to similar parts and the numeral 20 designates a well hole drilled or otherwise formed into the earth's surface. This well hole may for convenience of explanation, be considered as a deep hole oil well, wherein the work to be performed is usually far from the earth surface where the controls are located. Well casings 22 and 24 of various sizes may be positioned in the well hole in the usual manner.

Figures 1, 2:
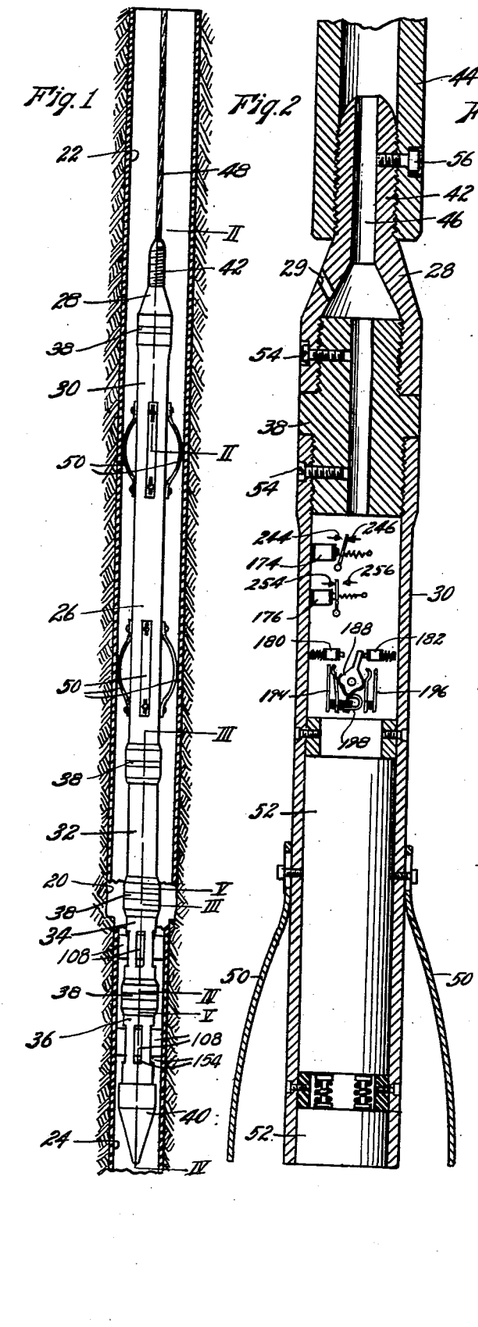
Fig. 1 is an elevational view of rotary expanding deep well fishing tool showing the parts with the outside covers intact.
Fig. 2 is an enlarged sectional view taken on line II—II of Fig. 1 with tubular lift in place of the cable lift.
Figure 3:
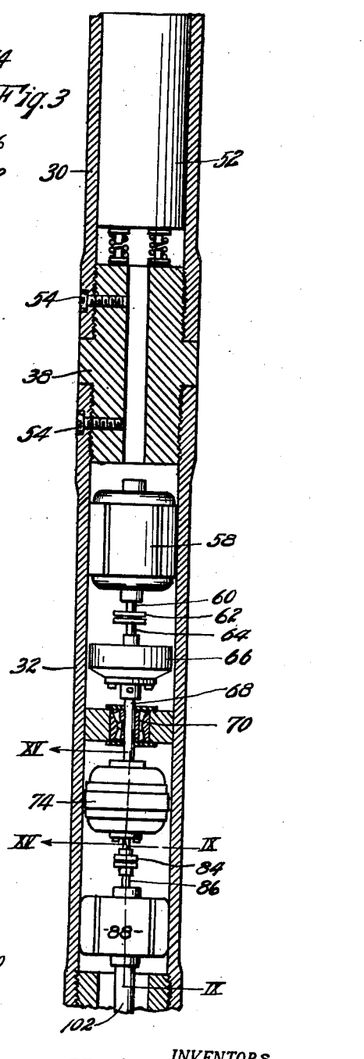
Fig. 3 is an enlarged sectional view taken on line III—III of Fig. 1.

The well fishing and handling tool 26 shown in elevation in Fig. 1 comprises a housing having several sections 28, 30, 32, 34, and 36 joined together by means of couplings 38. Screw threaded onto the lower housing member 36 is a conical fishing point 40 which serves to direct the tool into the opening in casings being fished for. Work other than casings might be the object of search and the only requirement of this object is that it must have an internal surface suitable for radial expanding jaws to engage.

The upper housing section 28 has a reduced externally threaded portion 42 adapted to receive the internally threaded tube 44 (see Fig. 2). Housing section 28 is also bored at 46 to receive a cable 48 for handling the tool. The end portion of cable 48 is secured in the frusto-conical portion of section 28 by any of the well known means. A diagonal hole 29 is formed through the inclined wall of housing member 28 to receive electric wires therethrough. Referring to Fig. 1 it will be noted that the housing 26 is provided with resilient guide or centering members 50 that ride against the inside wall of casing 22. Housing member 30 carries a battery of cells 52 which are properly charged and connected to drive a motor as hereinafter set forth.

It will be noticed that the couplings 38 are each secured against rotation relative to their respective attached housing sections by means of screws 54. Also tubular tool support 44 may be secured to section 28 by means of a screw 56, in place of cable 48. Because of this latter type of connection to the tool it will be plain that members properly gripped by the gripping members may be unscrewed from their attached parts because of the twisting torque that can be exerted there against.

Housing member 32 carries a reversable electric motor 58 properly wound to be driven by the current from batteries 52. The motor shaft 60 is joined by flexible coupling 62 to clutch shaft 64 which carries the clutch 66. The shaft 68 mounted in bearing 70 serves to drive the impeller 72 of the fluid drive 74. The high speed impeller blades 76 exert a pressure against the blades 78 mounted in housing 80 whereby the housing is rotated to drive shaft 82 which is attached thereto. This shaft is joined by flexible coupling 84 to the high speed shaft 86 of the speed reducer 88. This high speed shaft 86 has an integral pinion 90 which meshes with the upper section 92 of each of planetary gears 91, each of said gears having an upper section 92 and an integral lower section 97, and being rotatably mounted in cage 93, which is mounted for rotation axially in the unit 74. Sections 92 intermesh with the primary internal gear 94 rigidly fixed in housing 96 of the speed reducer. The lower sections 97 of the planetary gears 91 turn with sections 92 and intermesh with secondary internal gear 98 which is rigidly attached to gear web 100, which is in turn splined to slow speed shaft 102. This slow speed shaft is mounted in bearings 104 fixed in housing 96.

Figure 4:
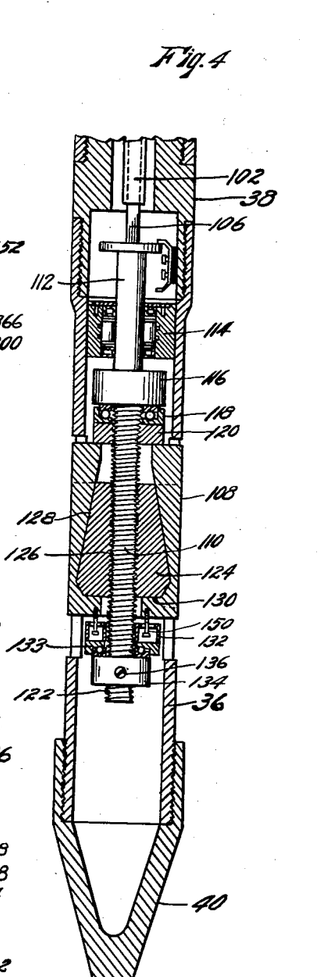
Fig. 4 is an enlarged sectional view taken on line IV—IV of Fig. 1 with one of the clutch members omitted.

Referring now to Fig. 4 it will be noted that the squared shaft 106 is slidably fitted into slow speed shaft 102 and is rotated therewith to rotate means whereby clamping wedges 108 are moved apart radially to grip the work.

Squared shaft 106 is on the upper end of a mandrel 110 having a cylindrical upper portion 112 mounted for rotation in bearing 114. Intermediate the ends of mandrel 110 is an integral enlarged cylindrical section 116 which serves as a bearing surface for a ball bearing 118 against which rests a bearing block 120. The lower end portion of mandrel 110 is threaded at 122 to receive the body member 124 thereon. This body member is substantially cylindrical in shape and is axially bored and threaded at 126 to receive the threaded portion of the mandrel. This body member is integral with housing member 36 and is provided with series of like tapered grooves 128 which are taperingly reduced in depth downwardly from the upper end thereof. The lower end portion of member 124 is also grooved inwardly toward its axis at 130.

Clamping wedges 108 are adapted to fit in the respective grooves 128 and into the lower end grooves 130 with their upper end portions resting against bearing block 120, so that as the mandrel thread 122 is rotated in one direction block 120 will contact the ends of all the wedges to force them downwardly and outwardly to engage the work. A portion of the threaded mandrel extends below the body member 124 and is provided with a thrust collar 132. Collar 132 rests on a ball bearing 133 which in turn is held in proper position by nut 134 which is set thereagainst. After nut 134 is positioned it is secured to the mandrel by setting set screw 136.

The lower end portion 138 of mandrel 110 is of reduced cylindrical form and is provided with a bearing 139 mounted in casing 34. The end portion of 138 is broached to form a square hole 140 to receive the upper squared rod of another mandrel so that the clamp gripping members is to be lifted. See Fig. 5. Where but one of the gripping members is to be used, the parts will be constructed and mounted as shown in Fig. 4.

With the body members made integral with the tool housing it is quite evident that the load being lifted will always force the wedges along the grooves in the body member and tighten against the work.

To release the wedges from their gripping action against the work the operator reverses the motor 58 thus forcing the thrust collar 132 upwardly against the lower ends of wedges 108 to force them radially inwardly.

To facilitate this inward movement of the wedges as they move longitudinally relative to the body member several series of ball bearings 142 disposed parallel with the bottom of grooves 128 and positioned in semi-circular grooves 144 and 146 formed respectively in wedges 108 and in the side walls of grooves 128. The ends of grooves 146 in the body member are closed so as to retain the series of balls 142 therein at all times.

Thrust collar 132 is of inverted cup shape and is provided in its bottom with a number of radial slots 148 corresponding with the number of wedges being used, and each wedge is provided with an axially disposed bolt 150 at its innermost edge portion, and is adapted to move along its respective slot 148 to stabilize the lower end of the wedge member.

It will be noticed that when the wedges are being used for outward thrust they will rest on the bottom of the grooves 128 and practically no load will be carried by the balls 142.

Figures 5, 6, 7, 8:
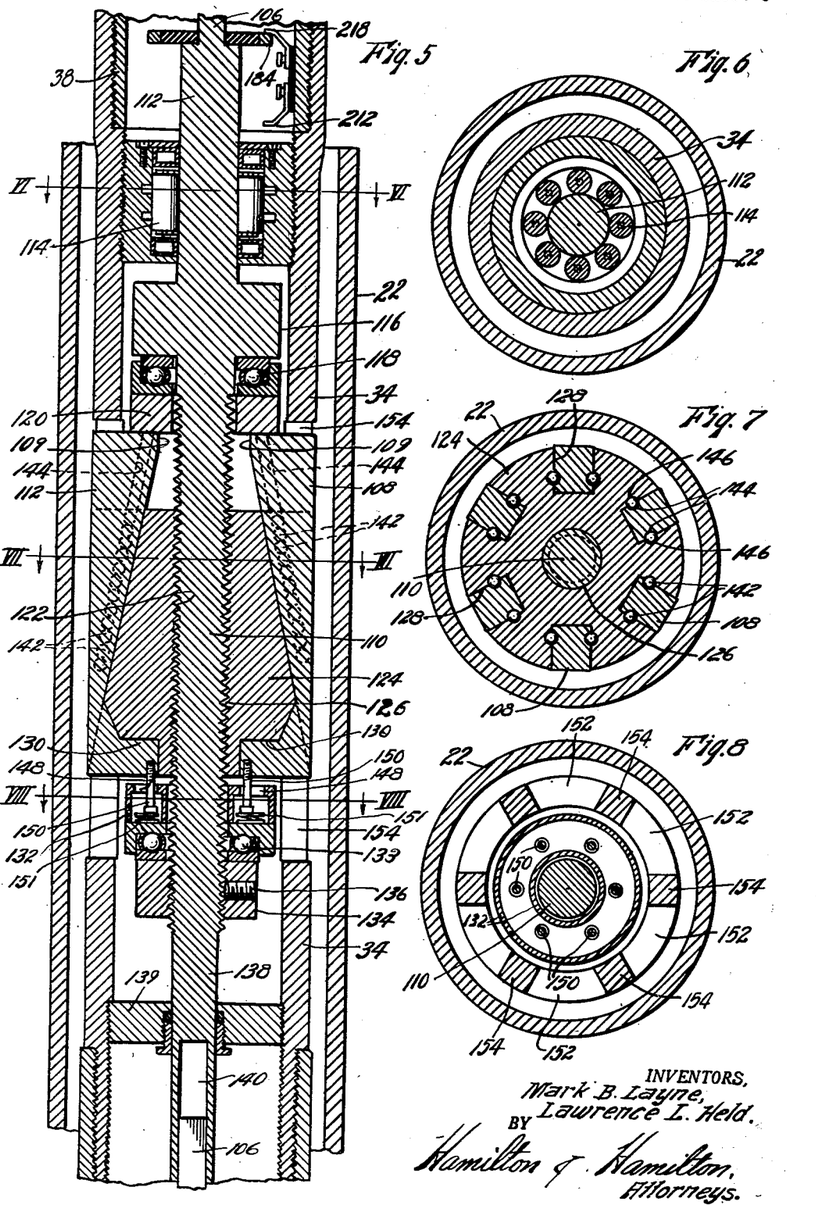
Fig. 5 is an enlarged sectional view taken on line V—V of Fig. 1.
Fig. 6 is a cross sectional view taken on line VI—VI of Fig. 5.
Fig. 7 is a cross sectional view taken on line VII—VII of Fig. 4.
Fig. 8 is a cross sectional view taken on line VIII—VIII of Fig. 5.
Figure 9:
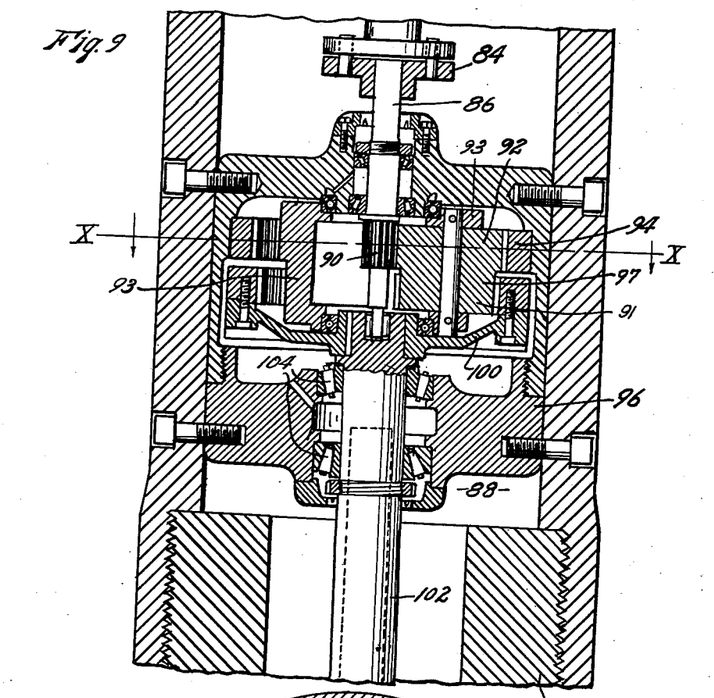
Fig. 9 is an enlarged sectional view taken on line IX—IX of Fig. 3 with some parts shown in elevation.
Figure 10:
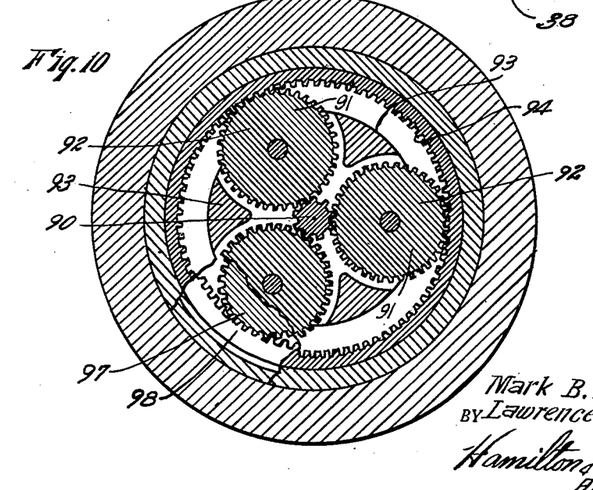
Fig. 10 is cross sectional view taken on line X—X of Fig. 9 with some parts broken away.
Figure 11:
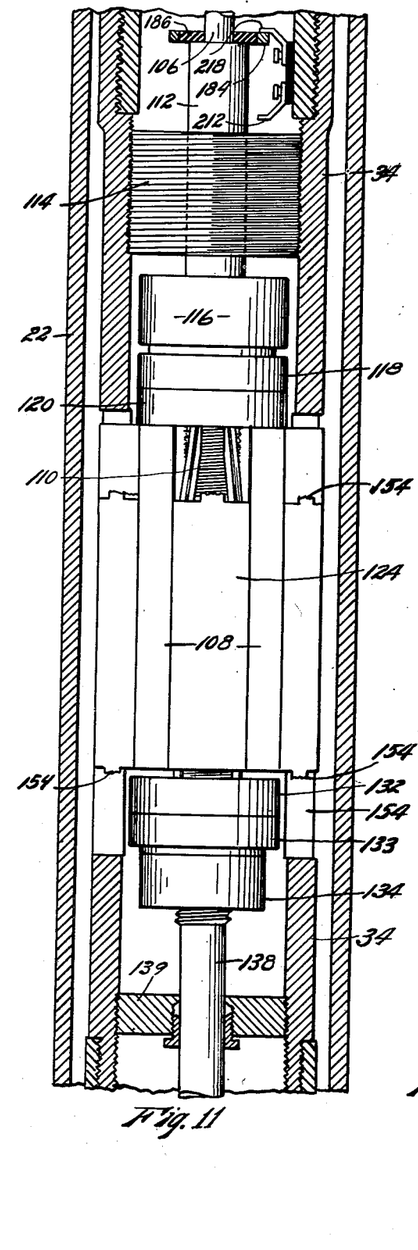
Fig. 11 is an enlarged sectional view similar to Fig. 5 of the gripping section of fishing tool with some of its parts shown in elevation.
Figure 12:
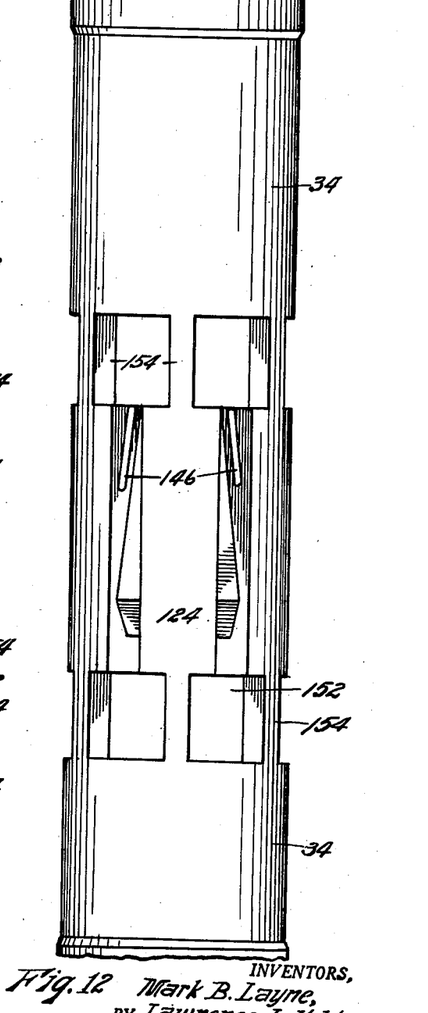
Fig. 12 is an elevational view of gripping section housing detached.

Referring to Figs. 8, 11, and 12 it will be noted that the portion of the housing 34 adjacent the opposite end of body member 124 is cut away at 152 to leave relatively narrow posts 154 which are of sufficient tensil strength to carry the maximum weight to be handled by the tool.

Figures 13, 14, 15:
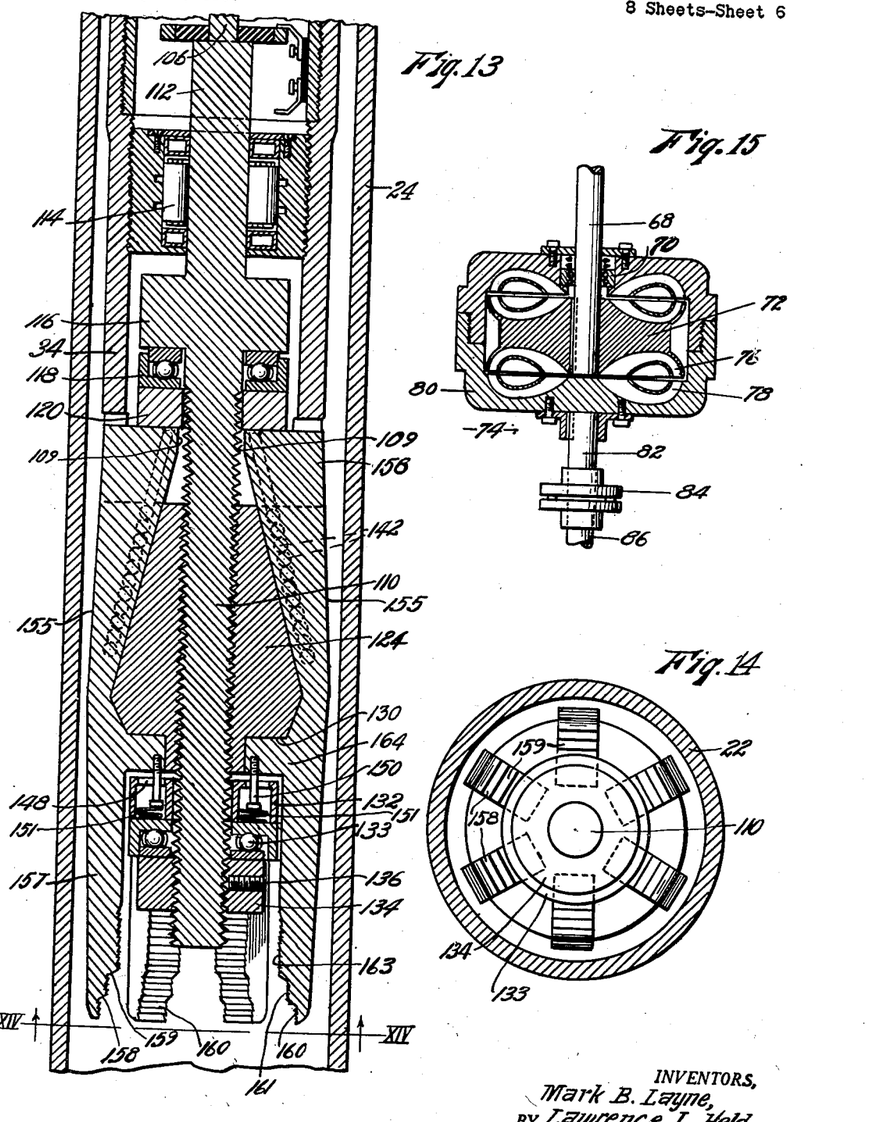
Fig. 13 is an enlarged sectional view of lower portion of the tool provided with outside gripping jaws.
Fig. 14 is a cross sectional view taken on line XIV—XIV of Fig. 13.
Fig. 15 is an enlarged sectional view of the fluid drive taken on line XV—XV of Fig. 3.

Referring now to the modified form of clamping jaw as shown in Figs. 13 and 14 it will be noted that the upper end portion 155 of each of the clamping wedges 156 flares outwardly and downwardly so as to engage in work having overhanging surfaces or offset recesses. Each of these wedges 156 have depending legs 157 which are offset at their outer extremeties at 158 and 159 presenting inwardly serrated jaws 160, 161, and 163 that serves to engage and grip the outside of well equipment to be removed from or positioned in the well. Adjacent the junction of leg 156 to body member 124 is an inwardly offset ledge 164 which normally fits into grooves 130 of body member 124. The operation of the modified form of outside clamping jaw is obtained by first opening the jaws by an upward movement of the body member relative to the jaws, whereby said jaws are expanded, then placing the jaws about the object to be gripped, then lowering the body member to force the jaws 156 inwardly against the work. It will be noted that in this outer gripping operation considerable pressure will be exerted against the ball bearings 142 thus somewhat limiting the load that may be handled by this form of jaw.

Figure 16:
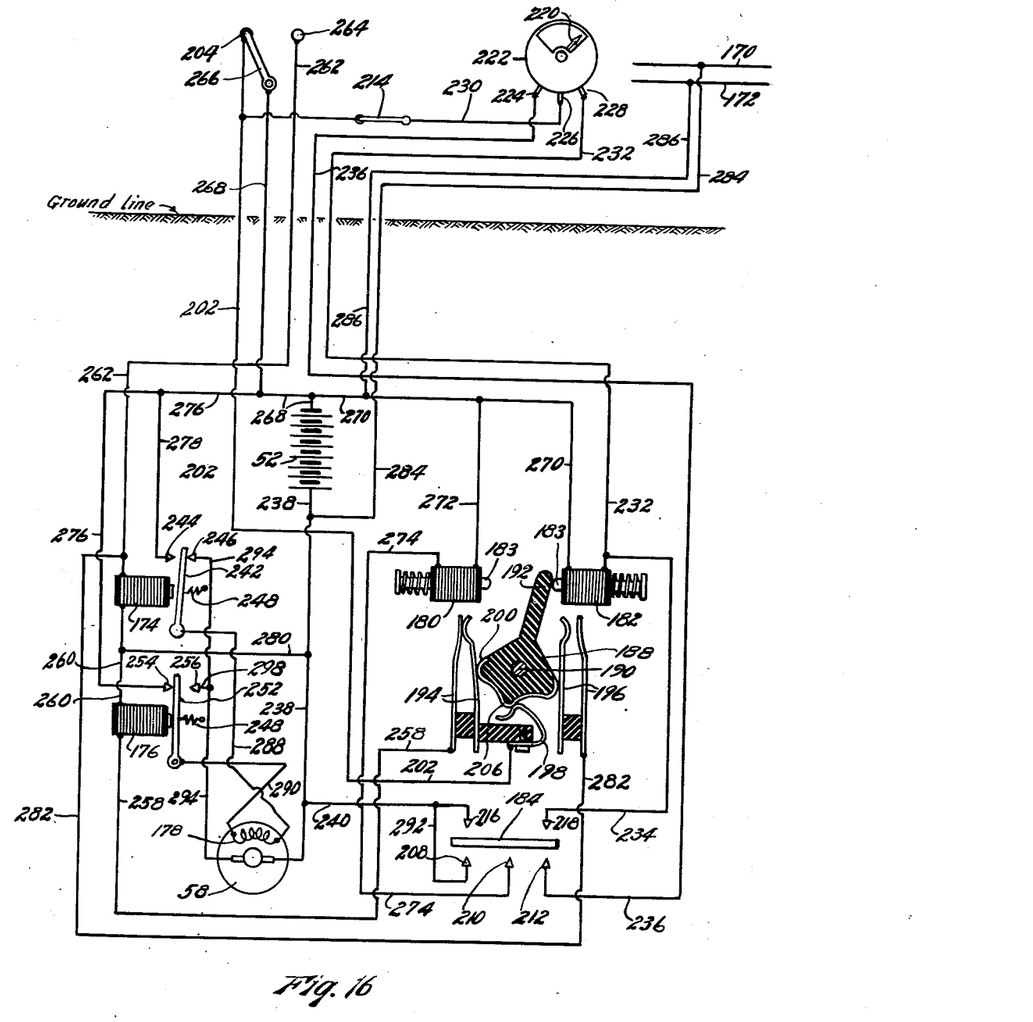
Fig. 16 is a diagrammatic view of the electric circuit for the electrically powered tool.

The operation of this electrically operated well fishing and handling tool is substantially as follows. The electrical diagram shown in Fig. 16 is a showing of a typical set up whereby the tool may be controlled and operated by means of controls positioned above the ground surface.

This circuit includes a source of electric current flowing through live wires 170 and 172 which serves to energize and actuate certain of the underground units as hereinafter set forth.

The reversable motor 58 disposed in this circuit serves to drive the threaded mandrel selectively in either direction to set the clamping wedges or to release their grip on the work. The electric power for motor 58 is furnished by batteries 52 located adjacent the work to be done in the well. Relay switches 174 and 176 serve to alternately reverse the flow of current through the field 178 of the motor. This reversal of motor may also be obtained by an automatic circuit within the tool including a pair of opposed solenoids 180 and 182 which are alternately energized as the mandrel 110 is first rotated in one direction to its limit to move contact member 184 carried by insulator 186 which is mounted on mandrel 110 to move longitudinally therewith. A switch member 188 made of electrical insulating material is pivoted at 190 and has an operating arm 192 which is positioned between the cores 183 of solenoids and adapted to be operated thereby to alternately close switches 194 and 196, which are united by spring contact member 198 through contact strip 200 and wire 202 with contact point 204. Spring contact member 198 is compressed by the action of lug 206 as it moves thereover and is held thereby until the other solenoid works to reverse the position of arm 192. When the motor operates to force the wedges outwardly to grip the work then the contact member 184 will move downwardly to close the contact points 208, 210, and 212. As the motor is automatically reversed by the closing of these points when switch 214 is closed and the wedging clamp is moved to the release position then the contact member 184 will rise to close contacts points 216 and 218 as points 208, 210 and 212 are open. These reversals of position of 184 will be indicated to the operator at the top of the well as the indicator hand 220 of the indicator 222 moves across its face due to wiring of the indicator. Indicator 222 is provided with three binding posts 224, 226, and 228. Post 226 is joined by wire 230 through switch 214 to wire 202 and post 228 is joined by wire 232 to one side of solenoid 182. Contact point 218 is connected by wire 234 to wire 232. Post 224 is connected by wire 236 to contact point 212. One side of motor 58 is connected by wire 238 to one side of battery 52. Contact point 216 is connected to wire 238 by means of wire 240. Relay switch 174 has an armature 242 adapted to oscillate between two contact points 244 and 246 so that when the coil 174 is de-energized the spring 248 will hold the armature against contact point 246 which is connected by wire 294 to the opposite side of motor 58. The relay switch 176 has an armature 252 which oscillates between contact points 254 and 256.

One leg of switch 194 is joined by wire 258 to one side of relay coil 176, while the other side of said relay coil is connected by wire 260 to one side of relay coil 174 which is connected at its other side by wire 262 to contact point 264 of switch 266. The other side of battery 52 is connected by wire 268 to switch 266. Solenoid coil 182 is connected at one point by wire 270 to wire 268 and the one side of solenoid coil 180 is connected by wire 272 to wire 270. The other side of solenoid coil 180 is connected with contact 210 by means of wire 274. Contact point 254 of relay switch 176 is connected by wire 276 with wire 268, and contact point 244 of relay switch 174 is connected to wire 276 by wire 278. Wire 280 connects wire 260 to wire 238. Switch member 196 is connected by wire 282 to wire 262. Line wire 170 is connected by wire 284 to wire 238 and, line wire 172 is joined by wire 286 to wire 268 through wire 270.

Armature 242 is joined by wire 288 to one end of field coil 178 and armature 252 is joined by wire 290 to the other end of field coil 178, thus making it possible by alternately energizing relay switch coils 174 and 176 to reverse the flow of current the fields of motor 50 to reverse the direction of rotation of the motor shaft 60. Contact point 208 is joined by wire 292 to wire 240. Contact point 246 is connected to one side of motor 58 by means of wire 294, and contact point 256 is joined to wire 294, by wire 298.

As shown in Fig. 16 the system is set so as to operate to rotate mandrel 110 in one direction and the current from battery 52 passes through wire 238 to motor 58 thence by wire 294 to contact point 246 thence through armature 242, wire 288 to one side of field coil 178 through said field coil, thence by wire 290 to armature 252, contact point 254, wire 276 and wire 268 to the other side of the battery. This operation will rotate the driving means located in the tool housing, to drive the wedges outward radially and into the inner walls of work, such as old casings, etc. to be removed from the well. When a predetermined pressure has been obtained against said inner wall clutch 66 will slip and all parts therebelow will cease to rotate and the cable 48 or the tube 44 may be operated from the ground surface to draw the casing from the well. If at any time during the operation the tension of the wedges against the inner wall of the work should lessen then the clutch 66 will again function to drive the mandrel to further tighten the wedges against the work. If at any time during the operation the contact member 184 should be moved to join together either the upper or lower set of contact points the direction of rotation of the mandrel would be reversed to move the wedges in the opposite radial direction. Furthermore if the operator fishing for a casing which is to be gripped by the wedges against its inner walls is not located and the operator has the controls in the positions shown the clutch 66 will not release and the contact member will move to connect the points 208, 210, and 212 to reverse the motor 58 so that the mandrel will be reversed to draw the wedges radially toward the center of the well hole, and as soon as the contacts 216 and 218 are closed the motor will again be reversed at each reversal of the motor indicator hand 220 of indicator 222 wall pass across the face of the dial thus indicating to the operator on the ground level that no work has been gripped and that a new effort will need to be made to contact the parts to be gripped.

When the operator located at the ground surface desires to reverse the motor 58 at the bottom of the well, all that he needs to do is to move switch arm 266 from contact point 204 to engage contact point 264 thus energizing relay coil 174 and deenergizing relay coil 176 thus reversing the direction of flow of the current through motor field coil 178.

Figure 17:
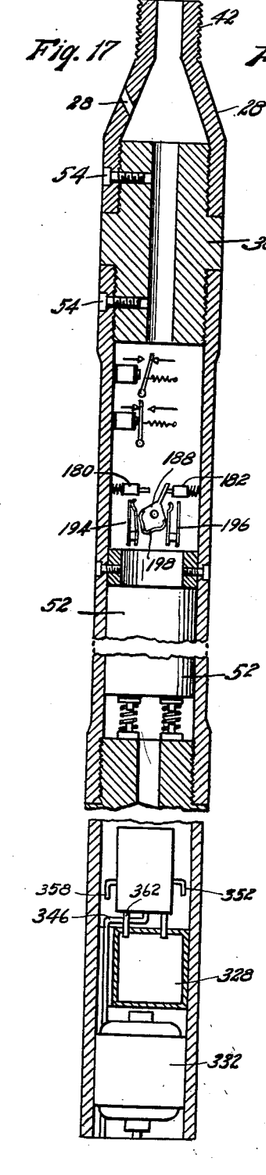
Fig. 17 is a sectional view of the upper portion of a modified form of the well fishing and handling tool wherein a double acting hydraulic drive cylinder is utilized to set the gripping wedges or jaws.
Figure 18:
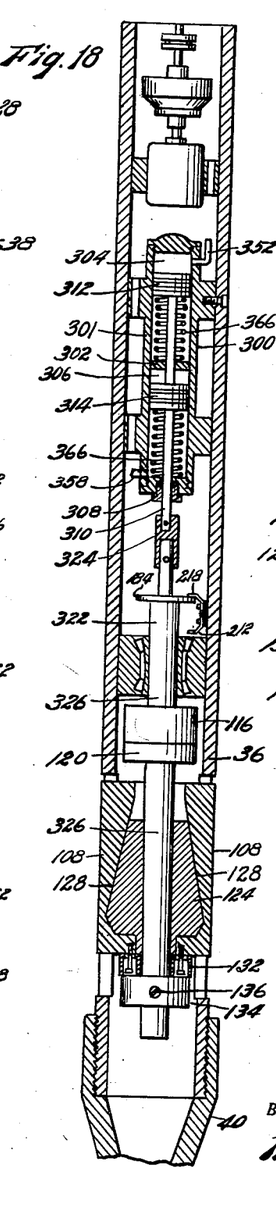
Fig. 18 is a sectional view of the lower portion of the modified form shown in Fig. 17.
Figure 19:
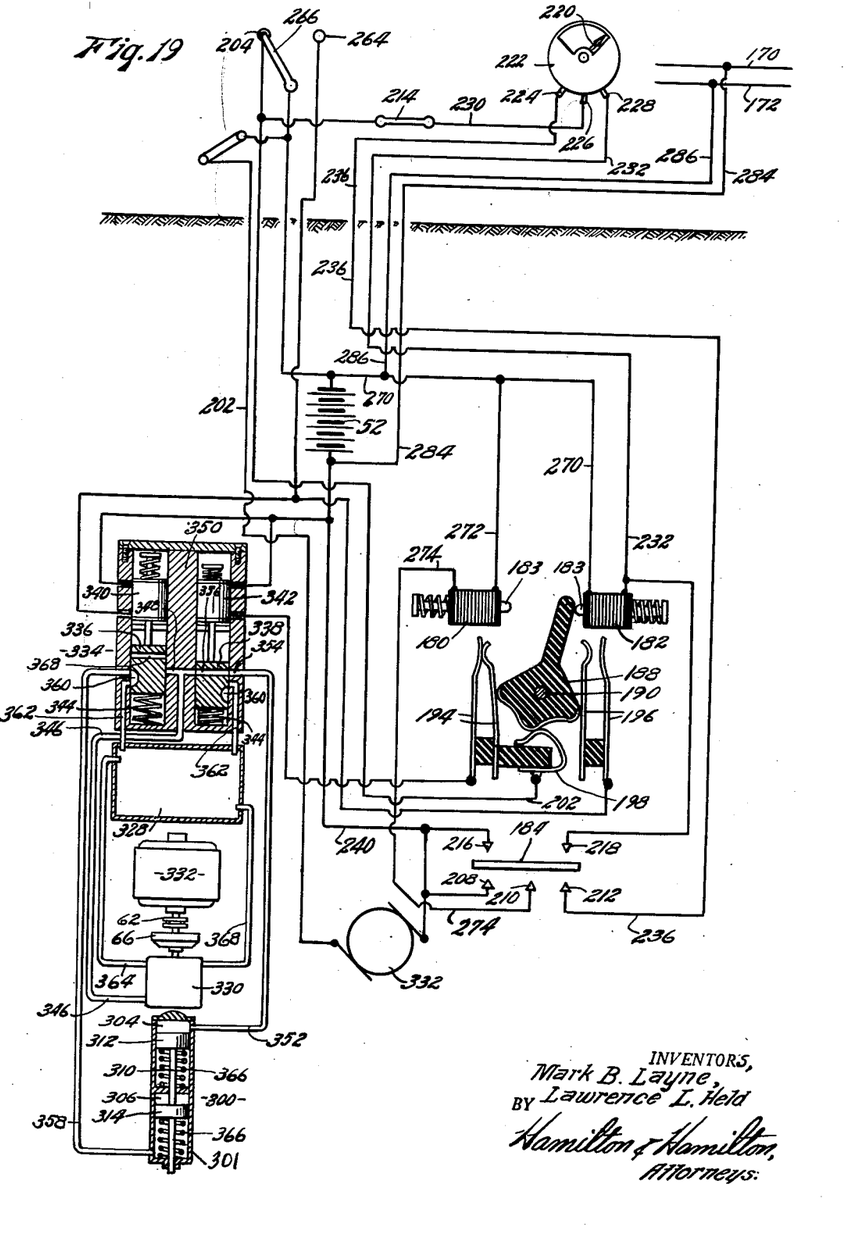
Fig. 19 is a diagrammatic view of the electric circuit and the hydraulic circuit for the modified form of the fishing and handling well tool.

Referring now to the modified form of fishing and handling tool shown in Figs. 17, 18, and 19, it will be noted that the wedges 108 are set and released by means of a double acting hydraulic cylinder drive 300 best shown in Fig. 18 having a piston cylinder 301 having a central cross partition 302 whereby the cylinder is divided into two substantially like cylinders 304 and 306 disposed respectively at opposite ends of the piston cylinder. Extending substantially the full length of the cylinder 300, through central portion 302 and through a stuffing box 308 at the lower end of the cylinder 301 is a piston rod 310 which carries a piston 312 in cylinder 304 and a piston 314 in cylinder 306. Piston 312 is urged to the raised position by means of a helical spring 366 positioned on rod 310 between partition 302 and the lower end of piston 312. Also a spring 366 is positioned beneath the lower end of piston 314 about piston rod 310 and against the lower inner wall 320 of cylinder 306 to urge the piston toward the raised position. The piston rod 310 is interconnected with the upper end of mandrel 322 by means of a coupling 324. The body 326 of mandrel 322 is of cylindrical form, and has an enlarged cylindrical section 116 against which rests a bearing block 120 which serves to contact and move the wedges 108 in the grooves 128 formed in the body 124 whereby the wedges are moved radially to engage the inner wall of a tubing that is to be drawn from the well.

Due to the fact that mandrel 322 is not threaded, a limiting collar 134 is mounted on the lower end of the collar and provided with a set screw 136 whereby it is properly secured to the mandrel to support thrust collar 132 properly in relation to the wedges 108. In general the structure and operating of this clamping section is substantially the same as that shown in Figure 5.

The hydraulic pressure system for operating the double acting hydraulic drive is best shown in Fig. 19 and comprises a liquid reservoir 328 which is maintained substantially filled, by a liquid pump 330 driven by motor 332 through coupling 62 and clutch 66. When the pressure gets too high in pump 330 the back pressure from the pump will cause the clutch 66 to slip, thus stopping the action of the pump until the pump pressure is reduced sufficiently to permit the pump to resume its pumping action. When the pump exceeds a predetermined pressure liquid will be bypassed directly from the pump 330 to reservoir 328 through pipe 364.

An electrically controlled valve 334 having two sliding piston valves 336 and 338 are operated respectively by solenoids 340 and 342. These valves are spring loaded at 344 to urge them toward the raised position. Tube 346 connects the outlet of pump 330 with the outlet passageway 348 in the valve block 350. Tube 352 connects the upper end of cylinder 304 with a passageway 354 in block 350 which is in axial alignment with passageway 348, so that when the solenoid 342 is energized as shown in Fig. 19 the cross port 356 in piston 338 will connect passageways 348 and 354 so as to permit a free flow of liquid from pump 330 directly into chamber 304 above piston 312, thus forcing the pistons down to cause an outward expansion of the clamping wedges as previously described when fluid under pressure is forced into cylinder 304 fluid contained in cylinder 306 will need to be exhausted through tube 358 to side wall passageway 360 in valve 336 which connects with a passageway 362 which drains into reservoir 328. Referring now to compressed valve 338 it will be noted that side wall passageway 360 is out of register with passageways 354 and 360.

The double acting hydraulic cylinder 300 is provided with compression springs 366 which maintain the gripping wedges in the retracted position, and in case of failure of the hydraulic system for any reason the gripping jaws will be released from their hold of any of the well parts, so that the tool may be removed from the well. This electrically controlled valve, or hydraulic selector valve 334 conveniently controls the flow of liquid from the pump 330 to reverse the action of the double acting hydraulic cylinder 300.

When piston 338 is retracted by spring 344 and solenoid 340 is energized to move piston 336 downwardly then liquid will be fed from pump 330, through tube 346 to passageway 348, through passageway 368 which will connect it to tube 358 which connects with piston 306 below piston 314 thus releasing the work securing wedges. It will be noted that the tube 368 serves to supply liquid to pump 330 from the supply reservoir 328. To insure more uniform movement of the work clamping parts springs 151 are positioned between the head of bolt 150 and the housing of ball bearing 133, see Figs. 5 and 13.

During the fishing operation as shown in Fig. 1 it will be observed that the spring guide members 50 are adapted to engage the inner wall of casing 22 to maintain the tool in substantially axial relation in the casing, however it will be noted that the spring members 50 are mounted on the upper extremity of the tool so that lower fishing point 40 will have some freedom of movement to properly engage in the hollow well parts positioned in the well casing.

When the wedges 108 as shown in Fig. 5 are in use it will be noted that due to the fact that they wedge against the walls of grooves formed in the body member there will be no undue strain on the gripping parts, and furthermore the greater the load being carried by the wedges the tighter the grip of the wedges against the work. It is apparent that the lifting capacity of this device would be unlimited.

What we claim is:

1. A well fishing and handling tool comprising a housing having a series of circumferentially spaced wedge shaped grooves formed therein, a wedge mounted in each of said grooves, a series of ball bearings interconnecting each of said wedges in its respective groove, and means operable in said housing to force said wedges in either direction along said grooves whereby the wedges may be forced either radially outwardly or radially inwardly.

2. A well fishing and handling tool comprising an elongated housing adapted to be inserted vertically in a well casing, said housing including an integral body member having longitudinal grooves formed therein, said grooves being tapered in depth and having their deeper ends towards the upper end of said housing, a wedge mounted slidably in each of said grooves and having outer surfaces adapted when expanded to engage said well casing, said body member having ball races formed therein in the side walls of each of said wedge grooves parallel with the tapered bottoms of said wedge grooves, and said wedges having ball races formed in the side walls thereof confronting and registering with the ball races of said wedge grooves, a series of balls carried in the ball races of each of said wedges and projecting into the matching ball races of said body member, and power means operable to move said wedges selectively upwardly or downwardly in a direction parallel to the tapered bottoms of said wedge grooves.

3. A well fishing and handling tool comprising an elongated housing adapted to be inserted vertically in a well casing, said housing including an integral body member having longitudinal grooves formed therein, said grooves being tapered in depth and having their deeper ends toward the upper end of said housing, a wedge mounted slidably in each of said grooves and having outer surfaces adapted when expanded to engage said well casing, said body member having ball races formed therein in the side walls of each of said wedge grooves parallel with the tapered bottoms of said wedge grooves, and said wedges having ball races formed in the side walls thereof confronting and registering with the ball races of said wedge grooves, a series of balls carried in the ball races of each of said wedges and projecting into the matching ball races of said body member, and power means operable to move said wedges selectively upwardly or downwardly in a direction parallel to the tapered bottoms of said wedge grooves, the ball races formed in said body member having closed ends whereby to retain said balls and limit the movement of said wedges.

4. A well fishing and handling tool comprising an elongated housing adapted to be inserted vertically in a well casing, said housing including an integral body member having longitudinal grooves formed therein, said grooves being tapered in depth and having their deeper ends toward the upper end of said housing, a wedge mounted slidably in each of said grooves and having outer surfaces adapted when expanded to engage said well casing, said body member having ball races formed therein in the side walls of each of said wedge grooves parallel with the tapered bottoms of said wedge grooves, and said wedges having ball races formed in the side walls thereof confronting and registering with the ball races of said wedge grooves, a series of balls carried in the ball races of each of said wedges and projecting into the ball races of said body member, and power means operable to move said wedges selectively upwardly or downwardly in a direction parallel to the tapered bottoms of said wedge grooves, said power means including a reversible electric motor mounted in said housing and operably connected to said wedges.

References Cited in the file of this patent

UNITED STATES PATENTS

| Number | Name | Date |
|---|---|---|
| 1,457,139 | Bell et al. | May 29, 1923 |
| 1,621,947 | Moore | Mar. 22, 1927 |
| 1,728,136 | Power | Sept. 10, 1929 |
| 1,747,606 | Steiner et al. | Feb. 18, 1930 |
| 1,815,376 | Jones | July 21, 1931 |
| 1,815,462 | Denny | July 21, 1931 |
| 1,917,135 | Littell | July 4, 1933 |
| 2,061,864 | Wells | Nov. 24, 1936 |
| 2,106,235 | Brown | Jan. 25, 1938 |
| 2,118,991 | Turechek et al. | May 31, 1938 |
| 2,352,423 | Church | June 27, 1944 |
| 2,496,360 | Stone | Feb. 7, 1950 |